United States Patent [19]

Bernhardt

[11] 4,370,028

[45] Jan. 25, 1983

[54] METHOD OF PRODUCING LIQUID CRYSTAL DISPLAY DEVICES WITH ALIGNMENT LAYER FORMED FROM ORGANIC TIN COMPOUND OF THE TYPE $R_nSNX_{4-n}$

[75] Inventor: Joerg Bernhardt, Munich, Fed. Rep. of Germany

[73] Assignee: Siemens Aktiengesellschaft, Berlin & Munich, Fed. Rep. of Germany

[21] Appl. No.: 220,075

[22] Filed: Dec. 24, 1980

[30] Foreign Application Priority Data

Jan. 14, 1980 [DE] Fed. Rep. of Germany ....... 3001125

[51] Int. Cl.³ .............................................. G02F 1/133
[52] U.S. Cl. .................................... 350/341; 350/334; 350/340; 427/108; 427/126.2; 427/126.3; 427/169; 428/1
[58] Field of Search ............ 350/334, 339 R, 340–341; 428/1; 427/108, 126.2, 126.3, 169

[56] References Cited

U.S. PATENT DOCUMENTS

| | | | |
|---|---|---|---|
| 3,728,008 | 4/1973 | Allan | 350/160 LC |
| 3,786,486 | 1/1974 | Torresi | 340/336 |
| 3,854,793 | 12/1974 | Kahn | 350/340 |
| 3,973,057 | 8/1976 | Channin et al. | 427/108 |
| 4,261,650 | 4/1981 | Sprokel | 350/341 |
| 4,273,420 | 6/1981 | Watanabe et al. | 350/341 |

FOREIGN PATENT DOCUMENTS

| | | | |
|---|---|---|---|
| 2238429 | 2/1973 | Fed. Rep. of Germany | |
| 54-39147 | 3/1979 | Japan | 428/1 |
| 54-112658 | 9/1979 | Japan | 350/341 |

OTHER PUBLICATIONS

Von. G. J. M. van der Kerk et al., "*Chimia*", vol. 23, 1969, pp. 313–322.

Kahn et al., "Surface-Produced Alignment of Liquid Crystals", Proc. IEEE, 7-1973, pp. 823–828.

*Primary Examiner*—William H. Punter
*Attorney, Agent, or Firm*—Hill, Van Santen, Steadman, Chiara & Simpson

[57] ABSTRACT

An orientation layer for liquid crystal display devices is formed from an organic tin compound of the type:

$$R_n SnX_{4-n}$$

wherein R is an organic radical; X is a reactive residual radical and n is an integer ranging from 1 to 3, by applying such organic tin compound onto a free surface of a carrier plate of a liquid crystal display device and generating the desired layer. In a preferred embodiment, the organic radical is an alkyl and the reactive residual radical is chlorine. In a preferred embodiment, the orientation layer is applied via an immersion technique wherein a select organic tin compound is dissolved in a suitable organic solvent, applied to a carrier plate surface and thereafter dried at somewhat elevated temperatures. The so-obtained orientation layer is stable, strongly adherent to its substrate and gives adjacent liquid crystal molecules a specific angle of incidence, whose size depends on the selected tin compound as well as on the liquid crystal material utilized and can range between about 20° and 90°. Smaller angles of incidence can be obtained by rubbing the orientation layer. These orientation layers can also be made electrically conductive by doping and subsequent pyrolysis. In this manner, transparent electrodes and orientation layers for liquid crystal display devices can be produced from substantially identical starting materials and with very similar production conditions.

13 Claims, 1 Drawing Figure

U.S. Patent  Jan. 25, 1983  4,370,028
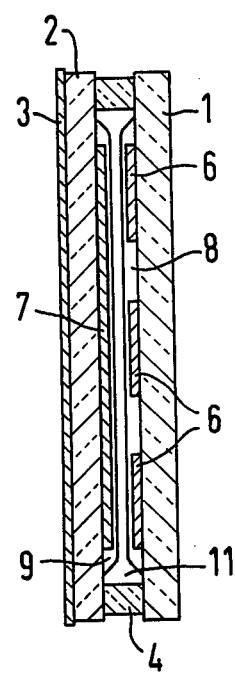

METHOD OF PRODUCING LIQUID CRYSTAL DISPLAY DEVICES WITH ALIGNMENT LAYER FORMED FROM ORGANIC TIN COMPOUND OF THE TYPE $R_nSnX_{4-n}$

BACKGROUND OF THE INVENTION

1. Field of the Invention

The invention relates to liquid crystal display devices and somewhat more particularly to a method of producing such devices with an orientation layer therein.

2. Prior Art

Methods of producing liquid crystal display devices comprised of two carrier plates which enclose a liquid crystal layer therebetween and carry an electrically conductive coating on their respective surfaces facing one another and also carry an orientation layer superimposed on such electrically conductive coatings are known. For example, German Offenlegungsschrift 22 38 429 suggests such a production technique wherein the orientation layer is generated from a silane compound having an alkyl radical and a hydrolyzable group.

Silanization is one of the few orientation techniques which has proceeded beyond the experimental stage and achieved practical significance. Silane layers are relatively stable and adhesive, provide defined liquid crystal textures or alignments and are relatively simple to produce, in comparison with other suggested alignment techniques, such as oblique vapor-deposition. With silanization, one need only to dissolve a select silane material in water, apply the solution to a substrate and thereafter dry the applied layer. However, this simple fabrication technique is not of particular significance when one considers the overall liquid crystal carrier plate coating: generally, a carrier plate is comprised of four layers, a protective layer, a conductive layer, an insulation layer and an orientation layer. In this sequence, the production of a conductive layer involves the greatest amount of time and work, because one must first generate such layer via a CVD (chemical vapor deposition) technique or via a sputtering technique and then structure the resultant layer in an etching process.

Of course, liquid crystal carrier plates can be constructed without separate orientation layers by adding certain surface-active substances to the liquid crystal layer so as to influence liquid crystal alignment or one can influence the conductive or protective layers in a specific manner so as to attain a defined liquid crystal texture. However, as experience has shown, attempts in this direction have not let to satisfactory results.

SUMMARY OF THE INVENTION

The invention provides liquid crystal display devices having novel orientation layers and method of producing such layers from a class of compounds other than silanes, but which have similar good alignment properties, which can be generated just as simply as silane-containing orientation layers and which can be converted into transparent conductive layers without difficulty.

In accordance with the principles of the invention, a liquid crystal display device having two carrier plates which enclose a liquid crystal layer therebetween and each of which respectively carry an electrically conductive coating (electrode) on a respective surface thereof facing one another and carry an orientation layer superimposed above such electrically conductive coating, is produced by generating the orientation layer from an organic tin compound of the type:

$$R_nSnX_{4-n} \qquad (1)$$

wherein R is an organic radical; X is a reactive residual radical and n is an integer ranging from 1 to 3.

In preferred embodiments, the inventive orientation layer is generated by first, dissolving a select organic tin compound of formula (1) in a suitable organic solvent, second, applying the resultant solution onto a select surface of a carrier plate and, third, heating the so-coated carrier plate.

A particularly preferred method of generating such orientation layer is to prepare a bath containing a select organic tin compound of formula (1) in a suitable organic solvent, such as toluene, and immersing a carrier plate therein and withdrawing such plate from the bath at a relatively uniform rate so that a layer of the solution remains on at least a select surface of the plate and thereafter heating such plate for about 20 to 40 minutes at temperatures in the range of about 100° to 120° C.

In preferred embodiments of the invention, the organic radical of the organic tin compound of formua (1) is selected from the group consisting of alkyl, alkylamide, phenyl, biphenyl, triphenyl, cyanophenyl, cyanobiphenyl, cyanotriphenyl, cyclohexyl, bicyclohexyl, phenylcyclohexyl, biphenylcyclohexyl, cyanobiphenylcyclohexyl, phenylpyrimidine and cyanophenylpyrimidine. In certain preferred embodiments of the invention, the reactive residual radical of the organic tin compound of formula (1) is selected from the group consisting of chlorine, bromine and iodine. In certain other preferred embodiments of the invention, the reactive residual radical of the organic tin compound of formula (1) is an alcoholate of the OR' type, wherein R' is an alkyl or an aryl. Preferred organic tin compounds of formula (1) are selected from the group consisting of mono-n-alkyl-tin-dichlorides; di-n-alkyl-tin-dichlorides; di-n-alkyl-tin-diethoxides and mono-n-alkyl-tin-triethoxides.

In certain embodiments of the invention, before the generation of the orientation layer, an electrically conductive layer is formed on a select surface of a carrier plate by providing an organic tin compound of formula (1) with an oxidazable additive, whose oxide increases the electrical conductivity of tin oxide, generating a layer from the resultant admixture onto the select surface of a carrier plate and thereafter heating such layer in a manner so that the tin compound and the additive are converted into their respective oxides. In preferred embodiments, the abovenoted oxidizable additives have cations selected from the group consisting of indium, antimony, cadmium and rare earth metals having a valence of +3 or +5. In certain preferred embodiments of the invention, chemically identical organic tin compounds of formula (1) are utilized in generating an electrically conductive layer and an orientation layer on a carrier plate for a liquid crystal display device.

BRIEF DESCRIPTION OF THE DRAWING

The FIGURE is a schematic side elevational view of an exemplary liquid crystal display device constructed and operable in accordance with the principles of the invention.

DESCRIPTION OF PREFERRED EMBODIMENTS

The invention provides liquid crystal display devices having orientation layers and/or electrically conductive layers generated from a class of compounds, other than silane, but which exhibits similar good alignment properties as obtained with orientation layers generated from silane compounds, which are just as easily generated as orientation layers from silane compounds, and which can be readily converted into transparent conductive layers without particular additional outlays.

A large number of organic tin compounds have already been synthesized and technically investigated (cf. in this regard, for example, "Chimica", Vol. 23, 1969, page 313. Various organic tin compounds have been technically utilized for quite some time as, for example, plastic stabilizers, polymerization catalysts for various monomers, bio-and fungicidal agents, or as protective coatings. However, heretofore no one has used organic tin compounds in electro-optical display devices.

The orientation and/or conductive layers formed from the organic tin compounds of formula (1) exhibit excellent adhesion to an underlying substrate, which is at least equal to that of orientation layers formed from silane compounds. It is believed that the following occurrences at the substrate surface are responsible for this phenomena: the residual radicals are substituted by reacting with free SiOH or InOH groups on the surface of a substrate. Thereby, volatile compounds are split off and Si-O-Sn or In-O-Sn "bridges" are generated which permanently affix the applied or generated layer onto the substrate surface. As has been shown, the so-formed layer is very stable; presumably Sn-O-Sn polymers are formed.

The orientation effect of the inventive layers greatly depend on the individual organic tin compound selected and on the liquid crystal material being orientated or aligned. Thus, for example, cyanobiphenyls are completely homeotropically orientated by alkyl-tin compounds of varying lengths, whereas phenyl cyclohexanes are plate-perpendicularly oriented only by relatively long chain alkyl-tin compounds. Aromatic esters as well as mixtures of cyanobiphenyl and phenylpyrimidines exhibit less extreme behaviour; with alkyl-tin compounds having relatively short or mid-length organic radicals, they are aligned planarly tilted and are adjusted homeotropically tilted when the carbon chain in the organic radical of the tin compound has at least seven carbon atoms therein. In general, mono-n-alkyl-tin compounds align plate-perpendicular with shorter chain lengths than di-n-alkyl-tin compounds. This difference is hardly noticeable with cyanobiphenyls but is quite noticeable with aromatic esters as well as with mixtures consisting of cyanobiphenyls and phenyl-pyrimidines and is very noticeable with phenyl cyclohexanes.

Steric effects at the interface of an orientation layer/liquid crystal layer are certainly one of the prime causes for the orientation phenomena observed. Organic groups which are more or less long, extend from the orientation layer, between which adjacent liquid crystal molecules become enplaced and anchored—either over their entire lengths or at spacially conforming partial portions thereof. In instances where an orientation layer has relatively short-chained groups, the cyano groups of the liquid crystal molecules typically push their way in between such short-chained groups; with mid-length chains, it is particularly the alkyl or, respectively, the alkoxy groups of the liquid crystal molecules which attach themselves onto appropriate sites in the orientation layer; and relatively long chained carbon groups or radicals accept the complete liquid crystal molecules.

Liquid crystal molecules having a sterically hindersome structure, for example the phenyl cyclohexyls with their "bulky" cyclohexyl groups, only find sufficient space on orientation layers having extremely long radical chains. The exceptional character of liquid crystal systems based on phenyl cyclohexanes can be explained on this basis. The differing behaviour of mono- and di-n-alkyl tin compounds becomes explainable if such behaviour is based on steric phenomena: with a di-n-alkyl compound, the angle between two organic radicals, defined by the tetrahedral structure of the central tin atom, is approximately 120°. With relatively short alkyl chains, steric influence is minimal. However, steric influence increases with increased chain lengths and, with a larger number of carbon atoms, steric influence can only be compensated by a greater mobility of the chains. Accordingly, only very short or very long chains orientate exactly homeotropically. With mono-n-alkyl compounds, the tetrahedral structure of the tin atom causes the organic groups to assume an orientation which is practically perpendicular to the substrate surface. Further, because the organic groups in these type of compounds are at a greater distance from one another, the steric influence, which reduces the angle of incidence, is less overall.

The angle of incidence of liquid crystal molecules, which lie between 20° and 90° with untreated orientation layers, can be varied within relatively wide limits by thermal and/or mechanical after-treatment of the orientation layer and, if desired, can be reduced to values below 20°. For example, when a liquid crystal layer is heated to about 260° C., the angle of incidence normally increases. This tendency leads one to suspect that the reaction at the liquid crystal layer/orientation layer interface is completely terminated only at these temperatures and the reactive residual radicals which promote a planar orientation have completely disappeared. Also tending to bolster this assumption, is the fact that orientation layer heated to 260° C. no longer increases the conductivity of a liquid crystal material, i.e. no longer emits any ions. When one heat-treats at a noticeably higher temperature, for example, at 520° C., a special planar orientation occurs; given which, the quality of the layer carrier determines the direction of the liquid crystal orientator. Apparently, organic tin compounds loose their organic radicals under the influence of such a thermal load and are converted into tin oxides, which do not have their own orientation power. Accordingly, the liquid crystal texture is essentially determined by the surface structure of the tin oxide substrate.

Particularly small angles of inclination, as are required, for example, in multiplex rotary cells, can be produced by rubbing a tilted planarly orientating layer.

The organic tin compounds utilized in the practice of the invention are particularly attractive because they not only exhibit valuable orientation properties but can also be effortlessly converted into conductive layers. To accomplish this, one merely admixes a select organic tin compound with a suitable oxidizable additive, whose oxide increases the electrical conductivity of tin oxide, applies a layer of the resultant admixture to a select surface and thereafter thoroughly oxidizes the applied layer. In this manner, conductive and orientation layers can be generated which are very similar in composition and in their production techniques so that the overall carrier plate coating becomes more simplified. Preferably, such additives are selected from oxidizable materials having cations selected from the group consisting of indium, antimony, cadmium and rare earth metals having a valence of +3 or +5.

Referring now to the drawing, an exemplary liquid crystal display device 10 functioning with a so-called "guest-host" effect is illustrated. A cell of such device contains a front carrier plate 1 and a back carrier plate 2 which supports a reflection layer 3. The two carrier plates are tightly connected to one another by a frame means 4 and each plate respectively supports an electrically conductive coating on the surfaces thereof which face one another (a front electrode consisting of separately drivable segmented electrodes 6 and a back electrode consisting of a continuous electrode 7), as well as homeotropic orientation layers 8 and 9, respectively. The chamber formed by the frame means 4 and the two carrier plates 1 and 2 is filled with a liquid crystal layer 11. This layer can comprise a eutectic mixture of two azoxy compounds (for example, as commercially available under the trade name "N4" from Merck & Co. Inc.), to which a chiral-nematic material and a pleochromatic dye or pigment can be added. This liquid crystal layer can be switched between a homeotropic "off" state and a planar-cholesterol "on" state.

The orientation layer 11, which in this exemplary embodiment is an n-hexyl-tin-trichloride, can be produced in the following manner: first, the tin compound is dissolved in an appropriate organic solvent, such as toluene, with the proportions being so selected that a 0.2 to 5% solution is attained. Thereafter, a carrier plate which has otherwise been completely coated, is immersed for a few minutes into the solution and then withdrawn at a substantially uniform velocity, for example, at a rate of 1 cm/sec. In instances where it is necessary or desirable to insure that no premature hydrolysis occurs, the immersion step can occur within a suitable protective gas atmosphere, for example, nitrogen. To accomplish this, it is sufficient to merely flush the immersion container with a laminar gas stream. After immersion, the so-coated carrier plate is dried for about 20 to 40 minutes at a temperature in the range of about 100° to 120° C.

Synthesis of the initial or starting organic tin compounds is either known from the relevant literature or can occur in an analogous manner without further ado. Accordingly, only the synthesis of two representative compound groups, the alkyl-tin-chlorides and the alkyl-tin-alkoxides are briefly outlined below.

Alkyl-Tin-Chlorides

First, tetra-alkyl-tin compounds are produced via the so-called "Grignard-reaction" set forth below:

$$4RMgBr + SnCl_4 \rightarrow R_4Sn + MgBrCl \quad (2)$$

wherein R is n-$C_2H_5$, n-$C_3H_7$, etc., through n-$C_{12}H_{25}$ and n-$C_{16}H_{33}$. This tetraalkyl tin compound is then proportionated into alkyl-tin-chloride compounds with various degrees of substitution, as set forth below:

$$3R_4Sn + SnCl_4 \rightarrow 4R_3SnCl \quad (3a)$$

$$R_4Sn + SnCl_4 \rightarrow 2R_2SnCl_2 \quad (3b)$$

$$R_4Sn + 3SnCl_4 \rightarrow 4RSnCl_3 \quad (3c)$$

wherein R is an n-alkyl as defined above.

With the foregoing overal substitution reactions, one can vary the reaction time and temperature, which, with constant stoichiometric conditions, provide a control to the reaction so that the more preferred products, $R_2SnCl_2$ and $RSnCl_3$ are attained in approximately equal amounts as the primary products, in addition to very small amounts of $R_3SnCl$. At relatively long temperatures, a mixture of mono-, di- and tri-chlorides is attained, which upon further heating undergoes further reaction to yield the desired products via a complex reaction process, set forth below:

$$R_4Sn + SnCl_4 \rightarrow R_3SnCl + RSnCl_3 \quad (4a)$$

$$R_4Sn + 2SnCl_4 \rightarrow R_2SnCl_2 + 2RSnCl_3 \quad (4b)$$

$$RSnCl_3 + R_4Sn \rightarrow R_2SnCl_2 + R_3SnCl \quad (4c)$$

$$R_3SnCl + RSnCl_3 \rightarrow 2R_2SnCl_2 \quad (4d)$$

$$R_3SnCl + SnCl_4 \rightarrow R_2SnCl_2 + RSnCl_3 \quad (4e)$$

$$R_2SnCl_2 + SnCl_4 \rightarrow 2RSnCl_3 \quad (4f)$$

wherein R is as defined above.

By addition of the above reaction equations, one obtains an overall reaction scheme for the observed formation of $R_2SnCl_2$ and $RSnCl_3$ as the primary products, as set forth below:

$$3R_4Sn + 5SnCl_4 \rightarrow 4R_2SnCl_2 + 4RSnCl_3 \quad (5)$$

wherein R is as defined above. The variously substituted products can be separated by distillation, if desired.

Alkyl-Tin-Alkoxides

Dialkyl-tin-diethoxides are produced by converting the dialkyl-tin-dichlorides (produced via the synthesis routes described above) with sodium ethoxylate in absolute ethanol at 0° C., as set forth below:

$$R_2SnCl_2 + 2NaOC_2H_5 \rightarrow R_2Sn(OC_2H_5)_2 + 2NaCl \quad (6)$$

Mono-alkyl-tin-triethoxides are prepared by converting the mono-alkyl-tin-trichlorides (prepared via the synthesis routes described above) with sodium ethoxylate in absolute ethanol at 0° C., as set forth below:

$$RSnCl_3 + 3NaOC_2H_5 \rightarrow RSn(OC_2H_5)_3 + 3NaCl \quad (7)$$

Alkyl-tin-ethoxides with various degrees of substitution are synthesized from alkyl-tin-diethylamines as set forth below:

$$RSnCl_3 + LiNR'_2 \rightarrow RSn(NR'_2)_3 + 3LiCl \quad (8a)$$

$$RSn(NR'_2)_3 + 3R''OH \rightarrow RSn(OR'')_3 + 3HNR'_2 \quad (8b)$$

$$R_2SnCl_2 + 2LiNR'_2 \rightarrow R_2Sn(NR'_2)_2 + 2LiCl \quad (8c)$$

$$R_2Sn(NR'_2)_2 + 2R''OH \rightarrow R_2Sn(OR'')_2 + 2HNR'_2 \quad (8d)$$

wherein R, R' and R'' are as defined above.

The selection of a particular organic tin compound from the multiplicity of such compounds useful in the practice of the invention primarily depends on the liquid crystal material which is to be orientated and which angle of incidence is thereby to be produced.

In order to enable those skilled in the art to gain insight into the multiplicity of orientation effects attainable by following the principles of the invention, a compilation of how certain alkyl-tin-chlorides and alkyl-tin-alkoxides useful in the practice of the invention align certain currently available standard liquid crystal materials is set forth in Table I below.

TABLE 1

Orientation obtained with certain organic tin compounds with certain liquid crystal materials

| Organic Tin Compounds | Liquid Crystal Materials | | | |
|---|---|---|---|---|
| | ZLI 1132 | ROTN 132 | ROTN 403 | ROTN 570 |
| $(CH_3)_2SnCl_2$ | = | = | = 90° | ⊥ |
| $(C_2H_5)_2SnCl_2$ | = | = 90° | = 90° | = 90° |
| $(C_3H_7)_2SnCl_2$ | = | = 90° | = 90° | ⊥ |
| $(C_4H_9)_2SnCl_2$ | = | ⊥ St | = 90° | ⊥ |
| $(C_5H_{11})_2SnCl_2$ | = | = 90° | = 90° | ⊥ < |
| $(C_6H_{13})_2SnCl_2$ | = | = < | = 90° | ⊥ < |
| $(C_7H_{15})_2SnCl_2$ | = | = < | = | ⊥ |
| $(C_8H_{17})_2SnCl_2$ | = | ⊥ | ⊥ | ⊥ |
| $(C_9H_{19})_2SnCl_2$ | = | ⊥ | = | ⊥ |
| $(C_{10}H_{21})_2SnCl_2$ | = | ⊥ | ⊥ | ⊥ |
| $(C_{11}H_{23})_2SnCl_2$ | = | ⊥ | ⊥ | ⊥ < |
| $(C_{12}H_{25})_2SnCl_2$ | ⊥ < | ⊥ | ⊥ | ⊥ < |
| $(C_{16}H_{33})_2SnCl_2$ | ⊥ | ⊥ | ⊥ | ⊥ |
| $CH_3SnCl_3$ | = | = 90° | = 90° | ⊥ |
| $C_2H_5SnCl_3$ | = | = oV | = 90° | ⊥ |
| $C_3H_7SnCl_3$ | = | = 90° | = 90° | ⊥ |
| $C_4H_9SnCl_3$ | = 90° | = 90° | = 90° | ⊥ < |
| $C_5H_{11}SnCl_3$ | = 90° | = 90° | = 90° | ⊥ < |
| $C_6H_{13}SnCl_3$ | = 90° | ⊥ | ⊥ | ⊥ |
| $C_7H_{15}SnCl_3$ | ⊥ | ⊥ | ⊥ | ⊥ < |
| $C_8H_{17}SnCl_3$ | ⊥ | ⊥ < | ⊥ | ⊥ < |
| $C_9H_{19}SnCl_3$ | ⊥ | ⊥ < | ⊥ | ⊥ < |
| $C_{10}H_{21}SnCl_3$ | ⊥ | ⊥ < | ⊥ | ⊥ |
| $C_{11}H_{23}SnCl_3$ | ⊥ | ⊥ | ⊥ | ⊥ |
| $C_{12}H_{25}SnCl_3$ | ⊥ | ⊥ | ⊥ | ⊥ |
| $C_{16}H_{33}SnCl_3$ | ⊥ | ⊥ | ⊥ | ⊥ |
| $(C_4H_9)_2Sn(OC_2H_5)_2$ | = 90° | = | = 90° | = 90° |
| $C_4H_9Sn(OC_2H_5)_3$ | = St | ⊥ | ⊥ | ⊥ |
| $(C_7H_{15})_2Sn(OC_2H_5)_2$ | = St | ⊥ | ⊥ | ⊥ |

In the above Table:
= represents planar orientation
⊥ represents homeotropic orientation
< represents tilted orientation
oV represents orientation without a clear priviledged direction
St represents light scattering orientation
= 90° represents planar orientation in which the priviledged direction over the conductive layer is perpendicular to the priviledged direction over the un-coated substrate.

The liquid crystal materials listed in Table 1 are commercially available under the respectively designated trade names. ZLI 1132 is a liquid crystal material comprised of an eutectic admixture of cyanophenyl-cyanohexanes available from Merck & Co. Inc. ROTN 132 is a liquid crystal material comprised of a eutectic admixture of biphenyl ethers available from Hoffman-La Roche Co., which alo offers ROTN 403, a eutectic mixture of cyanobiphenyls and phenyl pyrimidines; and ROTN 570, a eutectic mixture of cyanobiphenyls.

Each of the liquid crystal cells for which the measurements compiled in Table 1 were made, were produced as follows: each of the two carrier plates were composed of glass and each was provided with a sputtered-on $InO_3$-$SnO_2$ conductive layer having a thickness of 0.15 μm. These conductive layers were tempered at 520° C. and were structured with a semi-concentrated mixture of hydrochloric acid and nitric acid (at a mixing ratio of about 30:1). The respective orientation layers were applied via the immersion technique at a thickness ranging between about 0.02 to 0.1 μm. The so-prepared carrier plates were bonded to one another at a distance of 12 μm.

Of course, the invention is not limited to the above exemplary embodiments. Thus, for example, organic tin compounds having reactive residual radicals other than chlorine or alcoholates and/or organic radicals other than alkyls can also be utilized in accordance with the principles of the invention to form orientation layers and/or conductive layers. Further, the orientation layers can also be applied in a manner different from the earlier-described immersion technique, for example, by spraying, casting, rolling or CVD. Moreover, those skilled in the art can provide the substrate of the orientation layer with a specific profile in instances where a very specific angle of inclination is desired.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim as my invention:

1. In a method of producing a liquid crystal display device comprised of two carrier plates which enclose a liquid crystal layer therebetween and each plate is provided with an electrically conductive coating (electrode) on a respective surface thereof facing one another and provided with an orientation layer thereabove, the improvement comprising wherein:

said orientation layer is generated from an organic tin compound of the type:

$$R_nSnX_{4-n}$$

wherein R is an organic radical, X is a reactive residual radical and n is an integer ranging from 1 to 3.

2. In a method as defined in claim 1 wherein said orientation layer is generated by first dissolving said organic tin compound in an organic solvent to obtain a solution, then applying such solution to a select surface of a carrier plate and thereafter heating the resultant plate sufficiently to obtain the orientation layer.

3. In a method as defined in claim 2, wherein said solution is applied by immersion of the carrier plate into such solution and the resultant plate is heated for about 20 to 40 minutes at temperatures ranging between about 100° to 120° C.

4. In a method as defined in claim 1, wherein said organic radical of the tin compound is selected from the group consisting of alkyls, alkyl amides, phenols, biphenyls, triphenyls, cyanophenyls, cyanobiphenyls, cyanotriphenyls, cyclohexyls, bicyclohexyls, phenyl cyclohexyls, biphenyl cyclohexyls, cyano biphenyl cyclohexyls, pheny pyrimidenes and cyano phenyl pyrimidenes.

5. In a method as defined in claim 1 wherein said reactive residual radical is selected from the group consisting of chlorine, bromine and iodine.

6. In a method as defined in claim 1 wherein said reactive residual radical is an alcoholate of the type OR', wherein R' is an alkyl or an aryl.

7. In a method as defined in claim 1, wherein said organic tin compound is selected from the group consisting of a mono-n-alkyl-tin-trichloride and a di-n-alkyl-tin-dichloride.

8. In a method as defined in claim 1, wherein said organic tin compound is selected from the group consisting of a di-n-alkyl-tin-diethoxide and a mono-n-alkyl-tin-triethoxide.

9. In a method as defined in claim 1, wherein prior to generation of said orientation layer, said electrically conductive coating is formed by first adding an oxidizable additive whose oxide increases the electrical conductivity of tin oxide to said organic tin compound to attain an admixture thereof; then generating a layer of such admixture onto a select surface of a carrier plate and thereafter heating the resultant layer in such a manner that said organic tin compound and said oxidizable additive are both converted into their respective oxides.

10. In a method as defined in claim 9, wherein said oxidizable additive has cations selected from the group consisting of indium, antimony, cadmium and rare earth metals having a valence of +3 or +5.

11. In a method as defined in claim 9, wherein an identical organic tin compound is utilized for forming the electrically conductive layer and for generating the orientation layer.

12. In an operative liquid crystal display device comprised of a pair of opposing carrier plates spaced from one another via a frame means so as to define a liquid crystal chamber therebetween, with the respective surfaces of each plate facing one another being provided with an electrically conductive coating and an orientation layer thereabove, and said chamber being filled with a liquid crystal layer, the improvement comprising wherein said orientation layer is generated from an organic tin compound of the type:

$$R_n SnX_{4-n}$$

wherein R is an organic radical, X is a reactive residual radical and n is an integer ranging from 1 to 3.

13. In an operative liquid crystal display device as defined in claim 12 wherein said electrically conductive coating is composed of an admixture of oxides obtained by heating an organic tin compound of the type:

$$R_n SnX_{4-n}$$

wherein R is an organic radical, X is a reactive residual radical and n is an integer ranging from 1 to 3, and an oxidizable additive whose oxide increases the electrical conductivity of tin oxide.

* * * * *